(12) United States Patent
Wakisaka et al.

(10) Patent No.: US 12,508,670 B2
(45) Date of Patent: Dec. 30, 2025

(54) WELDING APPARATUS AND CONTROL METHOD FOR WELDING APPARATUS

(71) Applicant: Honda Motor Co., Ltd., Tokyo (JP)

(72) Inventors: Taisei Wakisaka, Tokyo (JP); Noriyuki Unose, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 867 days.

(21) Appl. No.: 17/676,200

(22) Filed: Feb. 20, 2022

(65) Prior Publication Data

US 2022/0305585 A1 Sep. 29, 2022

(30) Foreign Application Priority Data

Mar. 29, 2021 (JP) ................. 2021-054697

(51) Int. Cl.
*B23K 26/21* (2014.01)
*B23K 1/005* (2006.01)
(Continued)

(52) U.S. Cl.
CPC ............ *B23K 26/21* (2015.10); *B23K 1/0056* (2013.01); *B23K 3/063* (2013.01); *B23K 26/0869* (2013.01); *B23K 26/38* (2013.01)

(58) Field of Classification Search
CPC .... B23K 20/123; B23K 31/003; B23K 26/04; B23K 26/21; B23K 26/38; B23K 3/087;
(Continued)

(56) References Cited

U.S. PATENT DOCUMENTS

2001/0013509 A1* 8/2001 Haschke ................ B23K 26/04
219/121.64
2006/0087952 A1* 4/2006 Chiu .................... G11B 7/1263
369/116
(Continued)

FOREIGN PATENT DOCUMENTS

JP 2006159234 A 6/2006
KR 20050014128 A * 5/2005 ........... B23K 26/032

*Primary Examiner* — Steven W Crabb
*Assistant Examiner* — Allison E Helferty
(74) *Attorney, Agent, or Firm* — Duft & Bornsen, PC

(57) ABSTRACT

Welding-apparatus configured to weld base-material through wire-material melted by welding-laser, includes: laser-applicator configured to apply welding-laser to welding-area; wire-feeder configured to feed wire-material to welding-area; detector provided on wire-feeder and configured to detect feed-amount of wire-material or reaction-force from wire-material; moving-unit configured to move welding-area or wire-material; controller configured to respectively control laser-applicator, wire-feeder, and moving-unit. Controller is configured to perform: controlling wire-feeder to stop feeding wire-material to welding-area; then controlling laser-applicator to stop applying welding-laser to welding-area; then controlling moving-unit so that welding-area and wire-material are separated from each other; determining whether wire-material has been welded to base-material based on feed-amount of wire-material or reaction-force from wire-material detected by detector; and controlling laser-applicator to apply cutting-laser when it is determined that wire-material has been welded to base-material.

5 Claims, 8 Drawing Sheets

(51) Int. Cl.
*B23K 3/06* (2006.01)
*B23K 26/08* (2014.01)
*B23K 26/38* (2014.01)

(58) Field of Classification Search
CPC .......... B23K 3/063; B23K 9/12; B23K 9/173; B23K 9/1093; B23K 26/211; B23K 1/0056; B22F 10/30; B33Y 50/02; B33Y 10/00; B33Y 30/00; C03B 33/091
See application file for complete search history.

(56) References Cited

U.S. PATENT DOCUMENTS

| | | | | |
|---|---|---|---|---|
| 2010/0200554 | A1* | 8/2010 | Uchida | B23K 26/044 |
| | | | | 219/136 |
| 2012/0298639 | A1* | 11/2012 | Wang | B23K 26/20 |
| | | | | 219/121.64 |
| 2014/0027429 | A1* | 1/2014 | Chantry | B23K 9/173 |
| | | | | 219/137.7 |
| 2018/0250763 | A1* | 9/2018 | Kita | B23K 9/1006 |
| 2018/0361494 | A1* | 12/2018 | Svendsen | B23K 31/125 |
| 2019/0168342 | A1* | 6/2019 | Andreasch | B23K 26/70 |
| 2019/0283182 | A1* | 9/2019 | Thornton | B23K 26/127 |
| 2022/0410322 | A1* | 12/2022 | Mohri | G05B 19/418 |
| 2023/0264283 | A1* | 8/2023 | Hatada | B23K 3/08 |
| | | | | 219/74 |

* cited by examiner

WELDING APPARATUS AND CONTROL METHOD FOR WELDING APPARATUS

CROSS-REFERENCE TO RELATED APPLICATION

This application is based upon and claims the benefit of priority from Japanese Patent Application No. 2021-054697 filed on Mar. 29, 2021, the content of which is incorporated herein by reference.

BACKGROUND OF THE INVENTION

Field of the Invention

This invention relates to a welding apparatus and a control method for the welding apparatus configured to perform laser brazing welding.

Description of the Related Art

Laser welding methods have been known that perform laser welding by continuously feeding a filler wire into the gap of a base material (for example, see Japanese Unexamined Patent Application Publication No. 2006-159234 (JP2006-159234A)). The method of JP2006-159234A includes previously setting the amount of feed filler wire in steps in accordance with the size of the gap of a base material and the load voltage value of a motor that feeds the filler wire, detecting the load voltage value of the motor during welding, and changing the amount of feed filler wire in steps in accordance with the detected value.

The method of JP2006-159234A simply controls the amount of feed filler wire in accordance with the load of the motor during welding and therefore may not be able to properly process the termination of the welding area.

SUMMARY OF THE INVENTION

An aspect of the present invention is a welding apparatus configured to weld a base material through a wire material melted by a welding laser, including: a laser applicator configured to apply the welding laser to a welding area; a wire feeder configured to feed the wire material to the welding area; a detector provided on the wire feeder and configured to detect a feed amount of the wire material or a reaction force from the wire material; a moving unit configured to move the welding area or the wire material; a controller configured to respectively control the laser applicator, the wire feeder, and the moving unit. The controller is configured to perform: controlling the wire feeder to stop feeding the wire material to the welding area; then controlling the laser applicator to stop applying the welding laser to the welding area; then controlling the moving unit so that the welding area and the wire material are separated from each other; determining whether the wire material has been welded to the base material based on the feed amount of the wire material or the reaction force from the wire material detected by the detector; and controlling the laser applicator to apply a cutting laser when it is determined that the wire material has been welded to the base material.

Another aspect of the present invention is a control method for a welding apparatus configured to weld a base material through a wire material melted by a welding laser. The welding apparatus includes: a laser applicator configured to apply the welding laser to a welding area; a wire feeder configured to feed the wire material to the welding area; a detector provided on the wire feeder and configured to detect a feed amount of the wire material or a reaction force from the wire material; and a moving unit configured to move the welding area or the wire material. The method includes: controlling the wire feeder to stop feeding the wire material to the welding area; then controlling the laser applicator to stop applying the welding laser to the welding area; then controlling the moving unit so that the welding area and the wire material are separated from each other; determining whether the wire material has been welded to the base material based on the feed amount of the wire material or the reaction force from the wire material detected by the detector; and controlling the laser applicator to apply a cutting laser when it is determined that the wire material has been welded to the base material.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
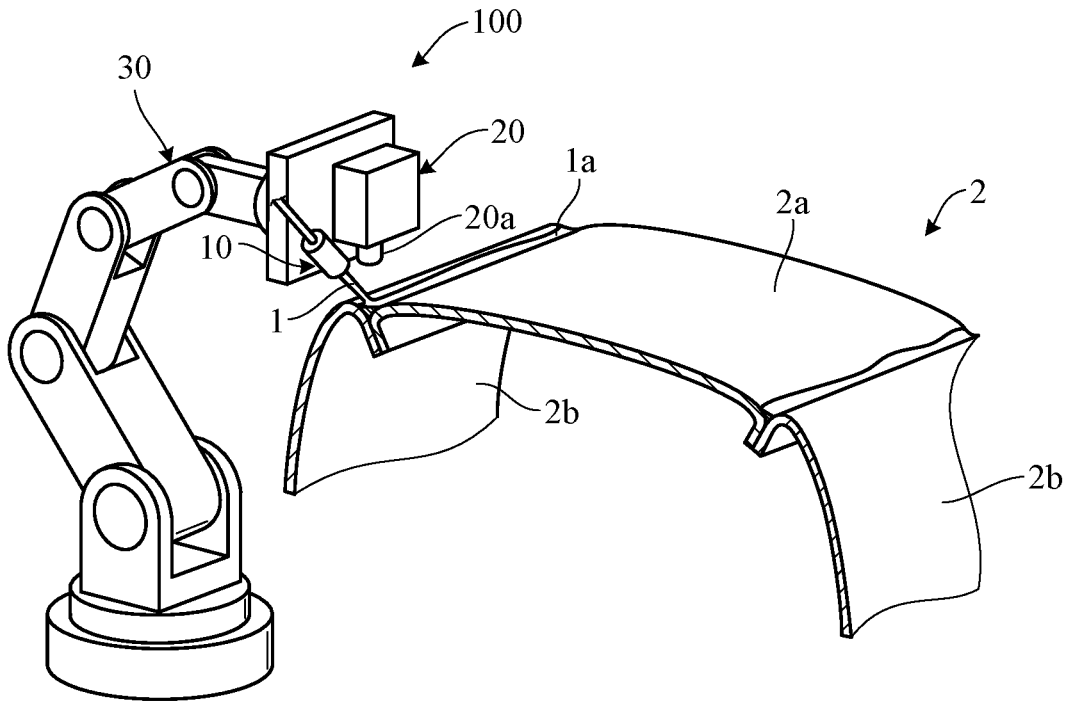
FIG. 1 is a perspective view showing an example of a laser brazing welding process to which a welding apparatus according to an embodiment of the present invention is applied.

Now, an embodiment of the present invention will be described with reference to FIGS. 1 to 11B. FIG. 1 is a perspective view showing an example of a welding process in which a welding apparatus 100 according to the embodiment of the present invention is used and shows a laser brazing welding process of joining together a roof panel 2a and left and right side panels 2b of an automobile serving as a base material 2 through a wire material 1 melted by a laser, as an example.

In laser brazing welding, the wire material 1 having a lower melting point than the base material 2 is melted as a brazing filler metal by the laser. For this reason, the base material 2 is less likely to be distorted than in arc welding, in which a base material discharges electricity to an electrode and thus becomes a high temperature. This makes laser brazing welding suitable for a welding process in which a thin steel sheet such as a roof panel is used as a base material. Also, the processing speed (about 100 mm/s) of laser brazing welding is higher than the processing speed (about 5 to 10 mm/s) of arc welding. This makes laser brazing welding also suitable for sequential welding processing in mass production of automobiles, or the like.

Figure 2:
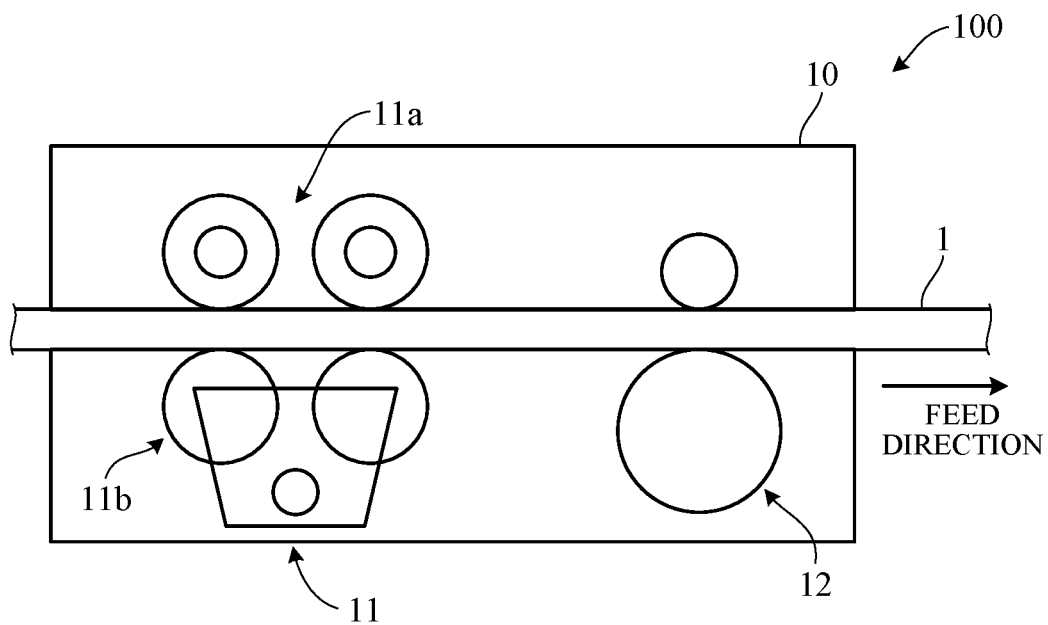
FIG. 2 is a side view showing an example of an internal configuration of a wire feeder shown in FIG. 1.

As shown in FIG. 1, the welding apparatus 100 includes a wire feeder 10 that feeds the wire material 1 to the welding area, a laser oscillator 20 that applies a laser to the welding area, and a robot 30 that moves the wire feeder 10 and laser oscillator 20. The wire feeder 10 includes feed rollers 11 (FIG. 2). The wire feeder 10 unreels the reeled wire material 1 and feeds it to the welding area. The laser oscillator 20 applies the laser to the welding area through an application head 20a. The robot 30 moves the wire feeder 10 and laser oscillator 20 along the joint (welding area) of the roof panel 2a and each side panel 2b. The wire material 1 fed to the welding area from the wire feeder 10 is melted by receiving the energy of the laser applied to the welding area by the laser oscillator 20 and then cooled and solidified and thus forms a bead 1a. In this way, the roof panel 2a and side panels 2b are jointed together.

FIG. 2 is a side view showing an example of the internal configuration of the wire feeder 10. As shown in FIG. 2, the wire feeder 10 includes the feed rollers 11 that feed the wire material 1 and a roller encoder 12 that detects the feed speed (the amount of feed per unit time) of the wire material 1. The feed rollers 11 include drive rollers 11a that are driven and rotated by a motor (not shown) and driven rollers 11b that press the wire material 1 toward the drive rollers 11a. By driving the motor, the wire material 1 is inserted between the drive rollers 11a and driven rollers 11b and fed. The roller encoder 12 is disposed such that the rotation surface thereof touches the wire material 1. The roller encoder 12 detects the feed speed in the feed direction of the wire material 1 on the basis of the rotation speed.

Figure 3:
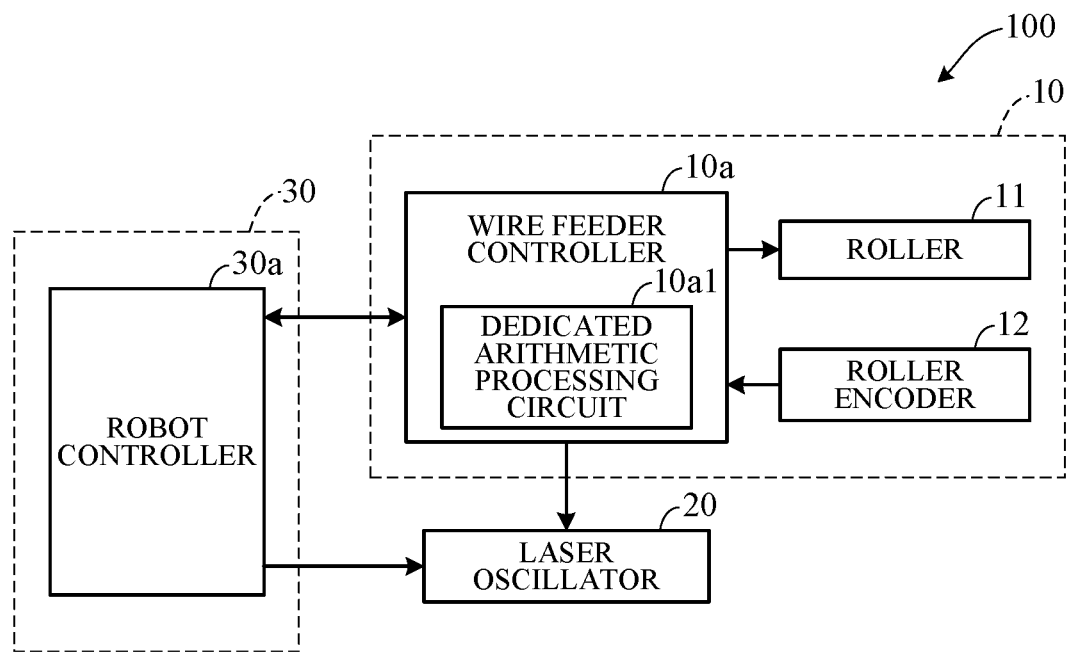
FIG. 3 is a block diagram showing an example of a configuration of main components of the welding apparatus according to the embodiment of the present invention.

FIG. 3 is a block diagram showing an example of the configuration of main components of the welding apparatus 100 according to the embodiment of the present invention. As shown in FIG. 3, the welding apparatus 100 further includes a wire feeder controller 10a that is disposed in the wire feeder 10 and controls the wire feeder 10 and a robot controller 30a that is disposed in the robot 30 and controls the robot 30. The wire feeder controller 10a and robot controller 30a each include a microcomputer, peripheral circuits thereof, and the like. The wire feeder controller 10a and robot controller 30a are communicatively connected to each other, as well as connected to the laser oscillator 20. The feed rollers 11 and roller encoder 12 are connected to the wire feeder controller 10a.

Figure 4:
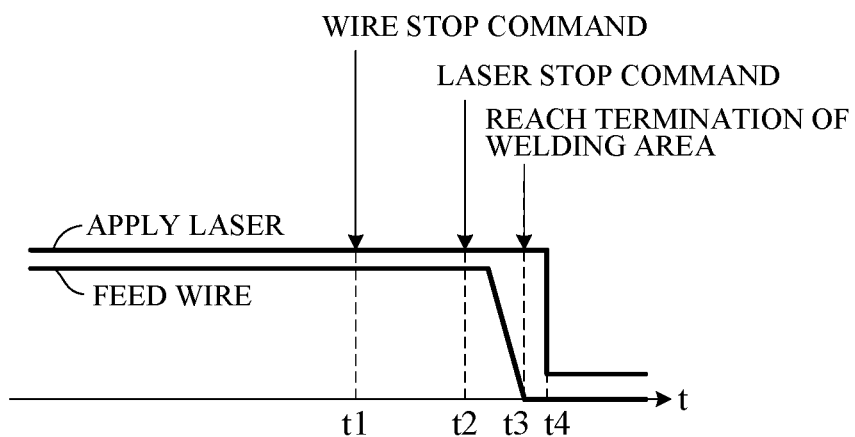
FIG. 4 is a time chart showing an example of operation of the wire feeder and a laser oscillator shown in FIG. 1 when a termination of a welding area is properly processed.
Figure 5:
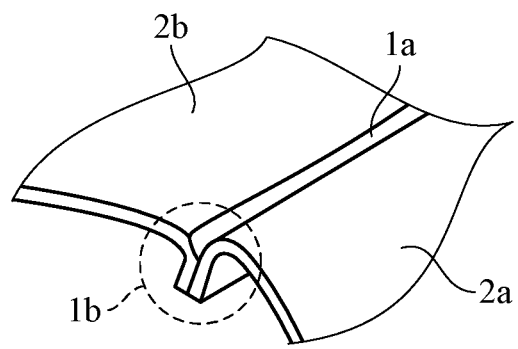
FIG. 5 is a perspective view showing an example of the properly processed termination of the welding area.

FIG. 4 is a time chart showing an example of the operation of the wire feeder 10 and laser oscillator 20 when the termination of the welding area is properly processed. FIG. 5 is a perspective view showing an example of the properly processed termination 1b of the welding area. As shown in FIG. 4, when the robot 30 moving along the welding area approaches the termination of the welding area, the robot controller 30a transmits a command signal to stop the feed of the wire material 1, to the wire feeder controller 10a (time t1). The robot controller 30a also transmits a command signal to stop the application of the laser, to the laser oscillator 20 (time t2).

The wire feeder controller 10a receives the wire stop command from the robot controller 30a and controls the wire feeder 10 so that the feed rollers 11 are stopped. Thus, the feed rollers 11 are stopped, resulting in a stop of the feed of the wire material 1 to the welding area (time t3). The laser oscillator 20 receives the laser stop command from the robot controller 30a and stops the application of the laser to the welding area (time t4).

The timing when the feed of the wire material 1 to the welding area is stopped varies due to a delay in communication, the inertia of the motor, the distortion state of the wire material 1, or the like. As shown in FIG. 4, at time t3, the robot 30 moving the wire feeder 10 and laser oscillator 20 reaches the termination of the welding area, and the feed of the wire material 1 to the welding area is stopped. Then at time t4, the application of the laser to the welding area is stopped. In this way, the termination of the welding area is properly processed.

That is, as shown in FIG. 5, at the termination 1b of the welding area, the wire material 1 receives the energy of the laser and is thus melted and forms a weld pool, which has yet to be cooled and solidified as a bead 1a. When the tip of the wire material 1 whose feed has been stopped follows the robot 30 and moves away from the welding area, that is, when the tip of the wire material 1 is separated from the tip of the weld pool, the tip of the weld pool is cooled and solidified as the bead 1a so as to adapt itself to the surface of the base material 2.

Figure 6:
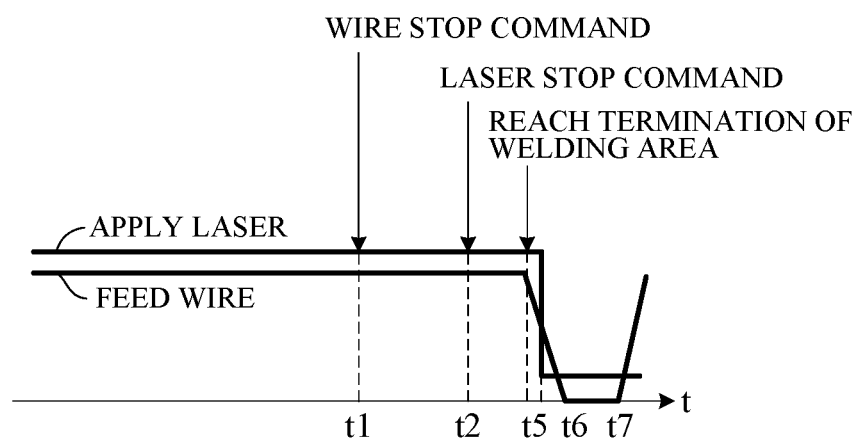
FIG. 6 is a time chart showing an example of operation of the wire feeder and the laser oscillator shown in FIG. 1 when a wire material is welded to the termination of the welding area.
Figure 7:
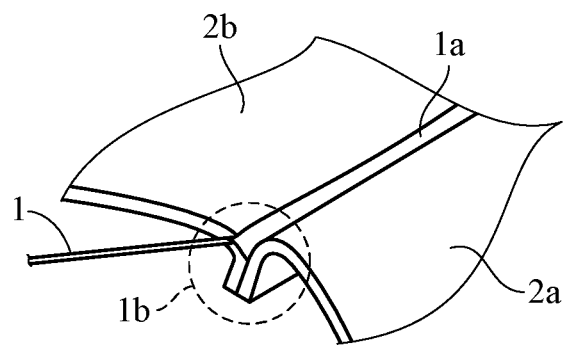
FIG. 7 is a perspective view showing an example of the termination of the welding area to which the wire material is welded.

FIG. 6 is a time chart showing an example of the operation of the wire feeder 10 and laser oscillator 20 when the wire material 1 is welded to the termination 1b of the welding area. FIG. 7 is a perspective view showing an example of the termination 1b of the welding area to which the wire material 1 is welded. The example of FIG. 6 shows that even after the application of the laser to the welding area is stopped at time t5, the wire material 1 is fed to the welding area until time t6. In this case, as shown in FIG. 7, the weld pool is cooled and solidified as the bead 1a such that the tip of the wire material 1 remains on the tip of the termination 1b of the welding area in an unseparated manner, and the wire material 1 is welded to the base material 2.

When the robot 30 continues to move away from the welding area with the wire material 1 welded to the base material 2 as described above, the wire material 1 pulled by the base material 2 is unreeled from the wire feeder 10 at time t7. In this case, the base material or motor may be damaged. For this reason, the welded wire material 1 is separated from the base material 2 by applying the laser thereto. The unreeling of the wire material 1 as described above is detected by the roller encoder 12 (FIG. 2), or by measuring the load on the feed rollers 11.

Figure 8:
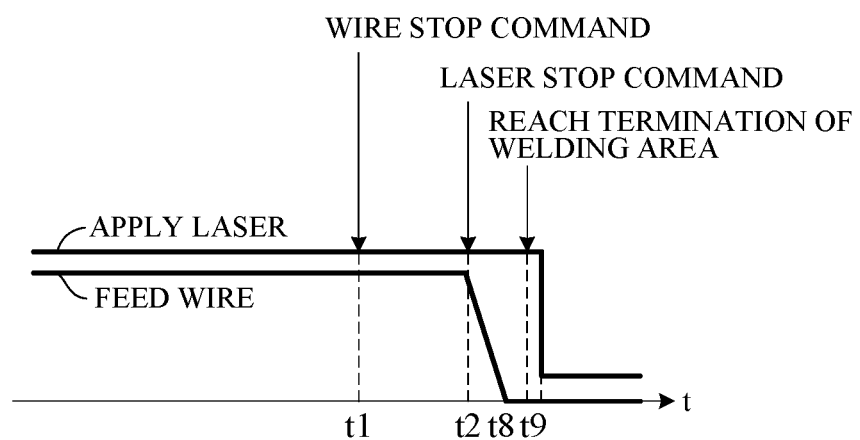
FIG. 8 is a time chart showing an example of operation of the wire feeder and the laser oscillator shown in FIG. 1 when a base material is welded at the termination of the welding area.

FIG. 8 is a time chart showing an example of the operation of the wire feeder 10 and laser oscillator 20 when the base material 2 is welded at the termination 1b of the welding area. The example of FIG. 8 shows that the feed of the wire material 1 to the welding area is stopped at time t8 before the robot 30 reaches the termination of the welding area at time t9. In this case, the laser is directly applied to the base material 2 and thus the base material 2 is melted and defects such as distortion occur. The defects such as the melting of the base material 2 as described above are difficult to solve by performing laser application or the like later. For this reason, the command to stop the feed of the wire and the command to stop the application of the laser are issued at timings close to the timing when the wire is welded, as shown in FIG. 6.

Figure 9A:
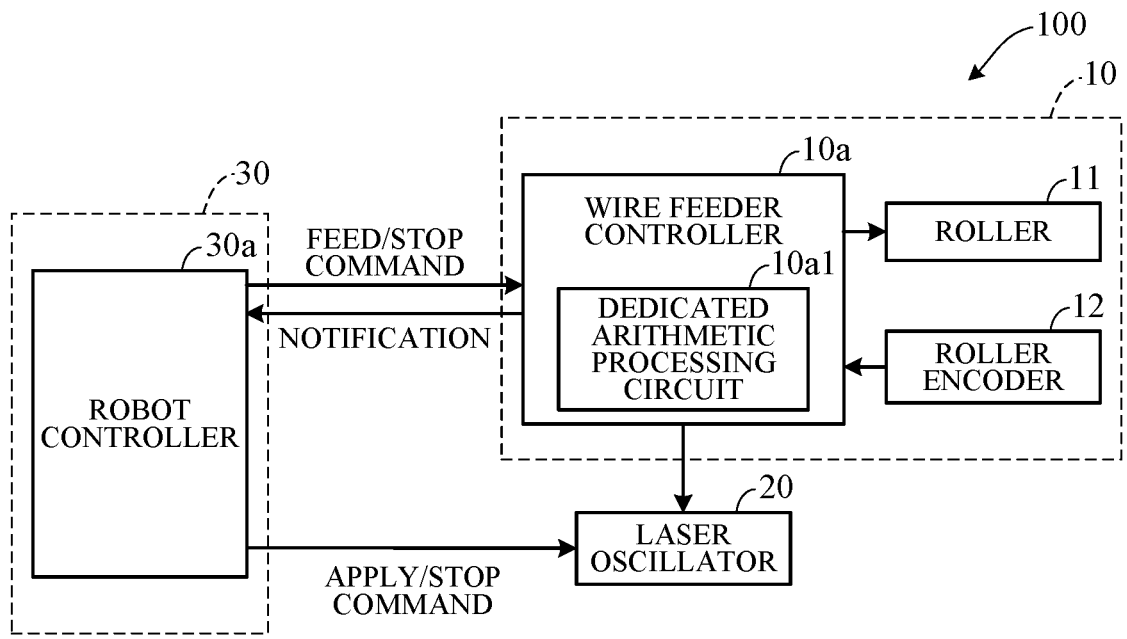
FIG. 9A is a block diagram for explaining operation of a robot controller and a wire feeder controller shown in FIG. 3, in a normal mode.
Figure 9B:
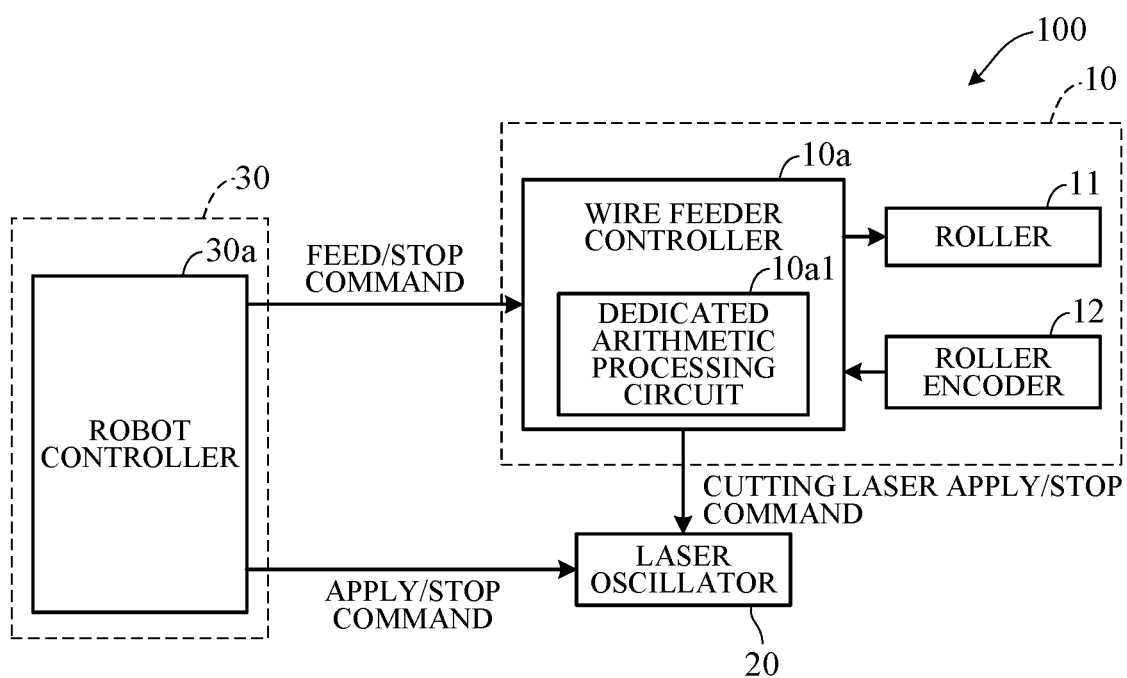
FIG. 9B is a block diagram for explaining operation of the robot controller and the wire feeder controller shown in FIG. 3 in a termination mode.

In the present embodiment, the welding apparatus 100 is configured as follows so as to be able to properly process the termination 1b of the welding area. FIGS. 9A and 9B are block diagrams showing the operation of the robot controller 30a and wire feeder controller 10a. FIG. 9A shows the operation in a normal mode in which portions other than the termination 1b of the welding area are welded, and FIG. 9B shows the operation in a termination mode in which the termination 1b of the welding area is welded.

In the normal mode of FIG. 9A, the wire feeder controller 10a controls the feed rollers 11 in accordance with a command from the robot controller 30a, as well as monitors the feed state of the wire material 1 on the basis of signals from the roller encoder 12 (normal-mode welding determination). When an abnormality occurs in the feed state of the wire material 1, the wire feeder controller 10a notifies the robot controller 30a of the abnormality and the robot controller 30a stops the robot 30 and the like. Thus, the welding process is suspended.

The normal-mode welding determination as described above is made to prevent a damage to the wire feeder 10 caused by the welding of the wire material 1 and thus the welding process is suspended. For this reason, this determination is made on the basis of the results of monitoring for a relatively long time (for example, about 100 ms) so that the determination is correct. Note that in the normal mode, the laser oscillator 20 applies a laser having the rated output (for example, about 4500 W) to the welding area in accordance with a command from the robot controller 30a.

Also in the termination mode of FIG. 9B, the wire feeder controller 10a controls the feed rollers 11 in accordance with a command from the robot controller 30a, as well as monitors the feed state of the wire material 1 on the basis of signals from the roller encoder 12 (termination-mode welding determination). In the case of the normal-mode welding determination, it takes a long time from when welding occurs until the abnormality is determined (for example, about 100 ms). Also, the wire feeder controller 10a notifies the robot controller 30a of the abnormality, and the robot controller 30a issues the laser oscillator 20 a command to apply a laser to separate the welded wire material 1. Such communication also takes time (for example, about 4 ms). Since the robot 30 continues to move also during this period, the application location departs from the termination 1b of the welding area before the laser for separation is applied. Also, after the wire material 1 is separated, the tip of the already cooled and solidified weld pool, that is, the tip of the bead 1a may protrude from the termination 1b of the welding area, leading to a loss of quality.

The termination-mode welding determination is made not only to prevent a damage to the wire feeder 10 caused by the welding of the wire material 1, but also to prevent such a quality problem. For quickness, this determination is made on the basis of the results of monitoring for a relatively short time (for example, about 1 ms). More specifically, after the feed is stopped, the feed speed of the wire material 1 detected by the roller encoder 12 is compared with a threshold (for example, "0") in each control cycle of the wire feeder controller 10a. If the threshold is exceeded, it is determined that the wire material 1 has been welded.

Immediately after it is determined that the wire material 1 has been welded, the wire feeder controller 10a directly issues the laser oscillator 20 a command to apply a laser (cutting laser) to separate the welded wire material 1 not through the robot controller 30a. The cutting laser is continuously applied until the feed speed of the wire material 1 detected by the roller encoder 12 falls below the threshold and it is determined that the welded wire material 1 has been separated. The wire feeder controller 10a according to the present embodiment is provided with a dedicated arithmetic processing circuit 10a1 such as a discrete circuit. The dedicated arithmetic processing circuit 10a1 includes an encoder counter that processes signals from the roller encoder 12, a CPU that determines whether the wire material 1 has been welded, on the basis of the processing results, and a D/A converter or digital I/O that outputs the determination result. Since the dedicated arithmetic processing circuit 10a1 determines whether the wire material 1 has been welded and issues the laser oscillator 20 the command to apply the cutting laser, the time taken from when it is determined that the wire material 1 has been welded until the command to apply the cutting laser is issued is reduced to, for example, about 1 ms.

More specifically, the cutting laser is applied such that the output thereof is gradually increased to the maximum output (for example, about 2000 W) equal to or lower than half the rated output (for example, about 4500 W) in the normal mode with a predetermined time (for example, about 50 ms). For example, the cutting laser is applied such that the output is gradually increased in accordance with the amount of the wire material 1 fed (unreeled) after the command to stop the feed is issued. Or, the cutting laser is applied as a pulse having an output (for example, about 2000 W) equal to or lower than half the rated output (for example, about 4500 W) in the normal mode. By making the output of the cutting laser equal to or lower than half the rated output in the normal mode and limiting the energy of the laser inputted per unit area of the welding area as described above, the base material 2 at the termination 1b of the welding area is prevented from being damaged.

In the termination mode, welding determination is made in a relatively short time, and the cutting laser is applied to the termination 1b of the welding area and the vicinity thereof. Thus, after the wire material 1 is separated, the tip of the weld pool is cooled and solidified as the bead 1a so as to adapt itself to the surface of the base material 2, that is, a loss of quality does not occur. As seen above, whether the welded wire material 1 has been separated and thus the welding has been eliminated is checked by comparing the feed speed (unreeling speed) of the wire material 1 detected by the roller encoder 12 with the threshold (for example, "0").

Figure 10:
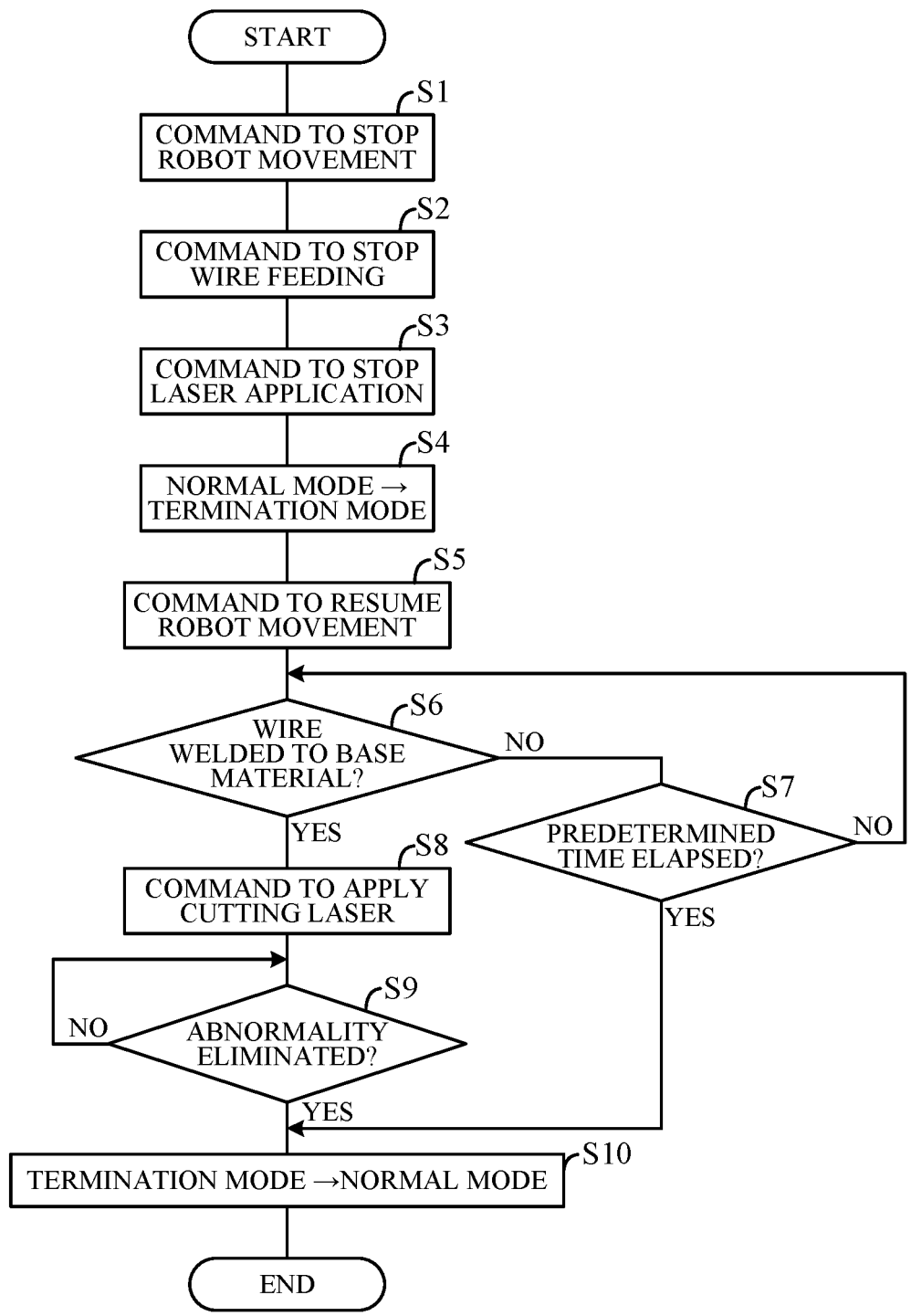
FIG. 10 is a flowchart showing an example of process performed by the welding apparatus according to the embodiment of the present invention.

FIG. 10 is a flowchart showing an example of a process performed by the welding apparatus according to the embodiment of the present invention. The process shown by the flowchart of FIG. 10 is started when the robot 30 moving along the welding area approaches the termination 1b of the welding area, for example, reaches the termination 1b of the welding area. As shown in FIG. 10, first, in S1 (S: process step), the robot controller 30a issues the robot 30 a command to stop the movement. Then in S2, the robot controller 30a issues the wire feeder controller 10a a command to stop the feed of the wire material 1. Then in S3, the robot controller 30a issues the laser oscillator 20 a command to stop the application of the laser having the rated output.

Then in S4, the wire feeder controller 10*a* changes the welding determination from the normal-mode welding determination to the termination-mode welding determination. Then in S5, the robot controller 30*a* issues the robot 30 a command to resume the movement. Then in S6, the wire feeder controller 10*a* determines whether the wire material 1 has been welded, on the basis of signals from the roller encoder 12. If the determination in S6 is NO, the process proceeds to S7 and it is determined whether a predetermined time (for example, about 1 s) has elapsed. If the determination in S7 is NO, the process returns to S6 and the termination-mode welding determination is continued; if the determination is YES, the process proceeds to S10.

On the other hand, if the determination in S6 is YES, the process proceeds to S8 and the wire feeder controller 10*a* issues the laser oscillator 20 a command to apply the cutting laser. Then in S9, the wire feeder controller 10*a* determines whether the welding of the wire material 1 has been eliminated, on the basis of signals from the roller encoder 12. S9 is repeated until the determination becomes YES. Then in S10, the wire feeder controller 10*a* changes the welding determination from the termination-mode welding determination to the normal-mode welding determination, thereby completing the process.

Figure 11A:
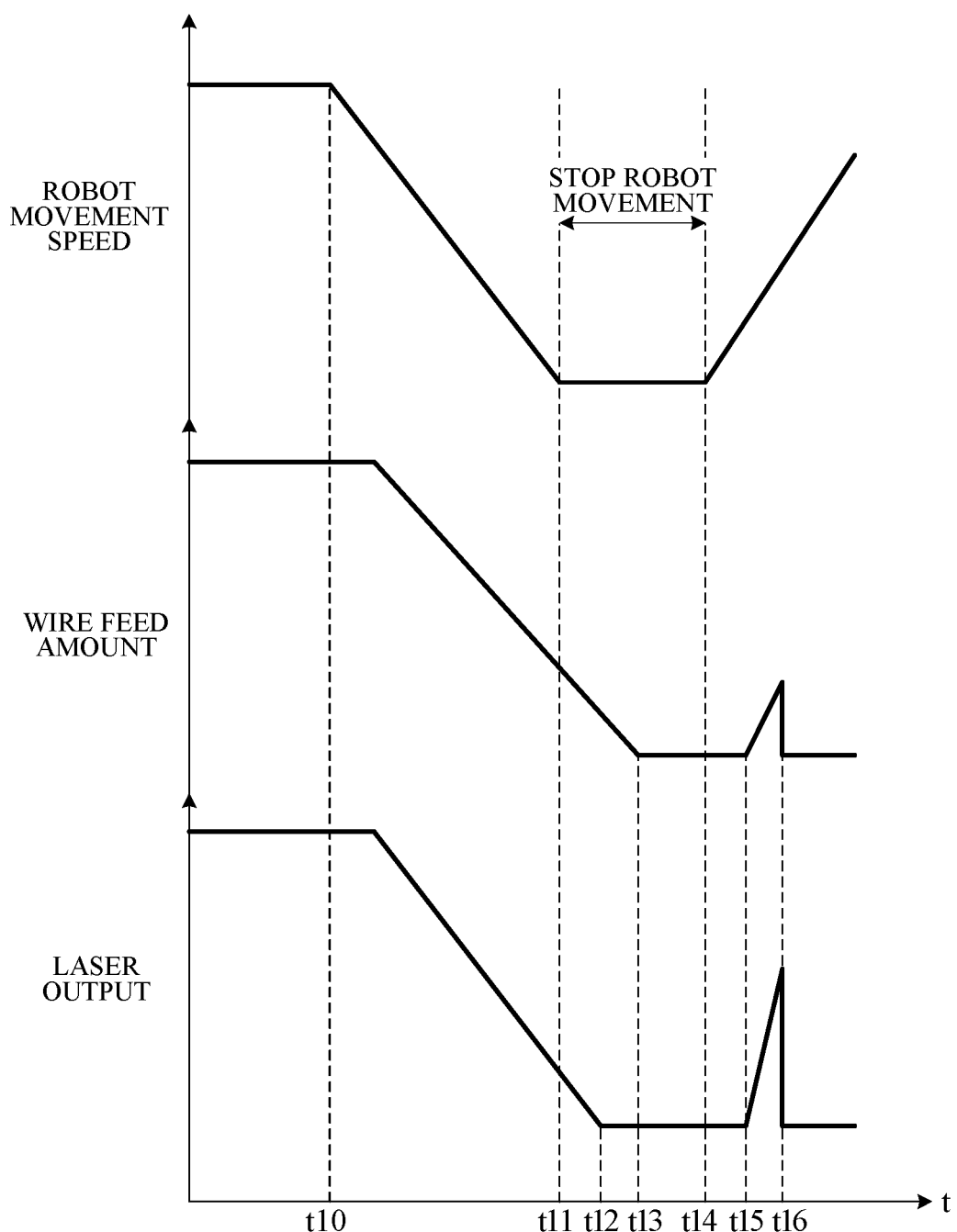
FIG. 11A is a time chart showing an example of operation of the welding apparatus according to the embodiment of the present invention.
Figure 11B:
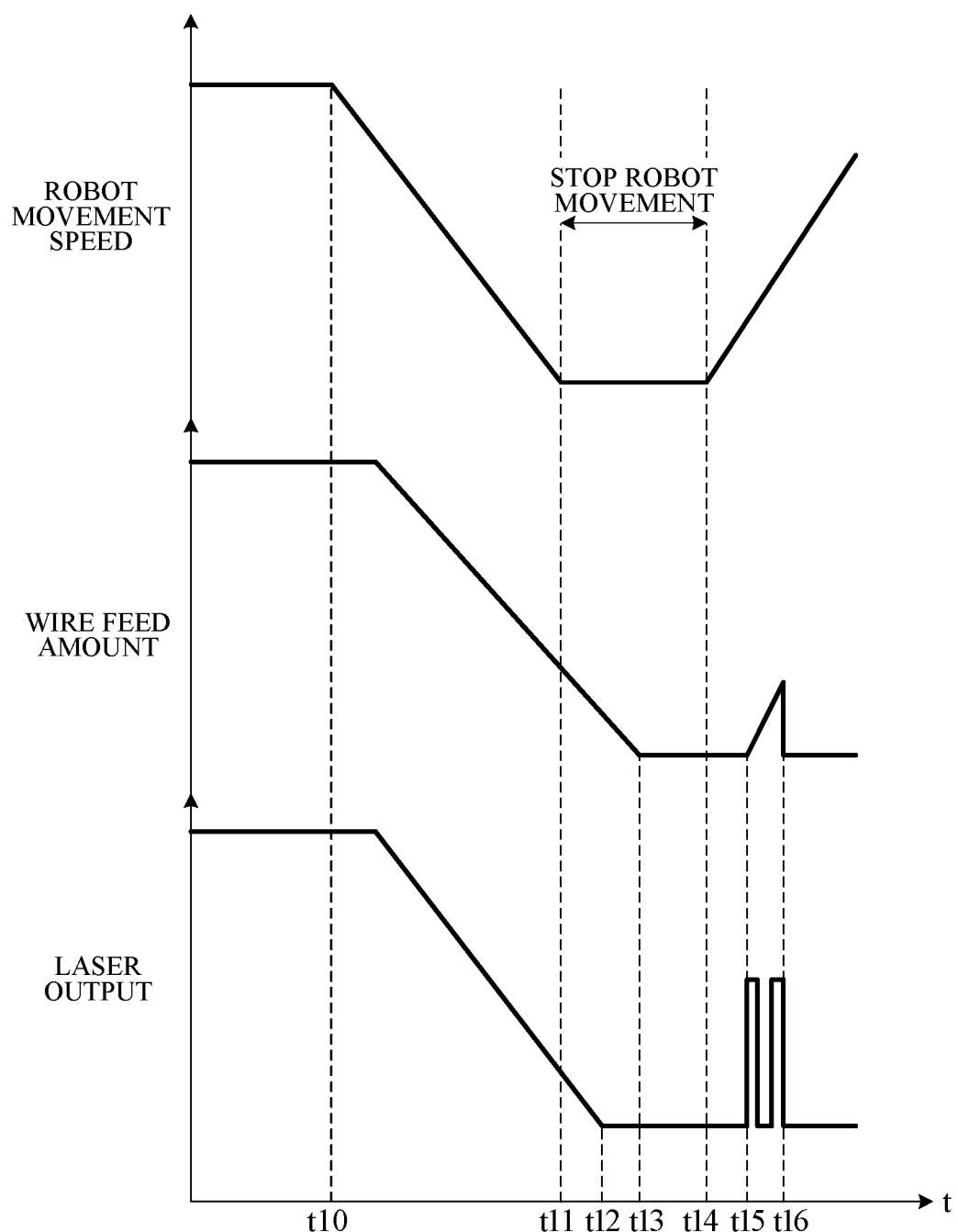
FIG. 11B is another time chart showing an example of operation of the welding apparatus according to the embodiment of the present invention.

FIGS. 11A and 11B are time charts showing an example of the operation of the welding apparatus 100 according to the embodiment of the present invention. As shown in FIG. 11A, when the robot 30 reaches the termination 1*b* of the welding area at time t10, a command to stop the movement of the robot 30, a command to stop the feed of the wire material 1, and a command to stop the application of the laser having the rated output are sequentially issued (S1 to S3 in FIG. 10). At time t11, the movement of the robot 30 is stopped. At time t12, the application of the laser having the rated output is stopped. Then, at time t13, the feed of the wire material 1 is stopped. Thus, the wire material 1 is welded to the termination 1*b* of the welding area.

At time t14, the movement of the robot 30 is resumed. Thus, the wire material 1 whose tip is welded to the termination 1*b* of the welding area is pulled as the robot 30 moves. Then, the distortion of the wire material 1 is eliminated. At time t15, the wire material 1 is unreeled from the wire feeder 10, it is determined that the wire material 1 has been welded, and the cutting laser is applied (S4 to S8). The tip of the wire material 1 is melted by the energy of the cutting laser. At time 16, the tip is separated from the termination 1*b* of the welding area. Thus, the unreeling of the wire material 1 from the wire feeder 10 is stopped, it is determined that the welding has been eliminated, and the application of the cutting laser is stopped (S9 to S10).

In FIG. 11A, from time t15 to time t16, the cutting laser is applied such that the output is gradually increased to the maximum output equal to or lower than half the rated output in the normal mode until time 10 in accordance with the amount of the unreeled wire material 1. On the other hand, in FIG. 11B, from time t15 to time t16, the cutting laser is applied as a pulse having an output equal to or lower than half the rated output in the normal mode until time t10.

As seen above, when the wire material 1 is unreeled after the feed of the wire material 1 is stopped, it is determined that the wire has been welded and the cutting laser is immediately applied. Thus, the welding is eliminated using the cutting laser having the low output before the weld pool at the termination 1*b* of the welding area is cooled and solidified. Also, even when welding of the wire is detected, the movement of the robot 30 is not stopped. Thus, the time required to perform the entire welding cycle is reduced The present embodiment can achieve advantages and effects such as the following:

(1) The welding apparatus 100 welds the base material 2 through the wire material 1 melted by the laser. The welding apparatus 100 includes the laser oscillator 20 that applies the laser to the welding area, the wire feeder 10 that feeds the wire material 1 to the welding area, the roller encoder 12 that is disposed in the wire feeder 10 and detects the feed speed of the wire material 1, the robot 30 that moves the welding area or wire material 1, and the controllers 10*a* and 30*a* that control the laser oscillator 20 and wire feeder 10 or control the robot 30 (FIGS. 1 to 3).

The controllers 10*a* and 30*a* perform the feed stop step S2 of controlling the wire feeder 10 so that the wire feeder 10 stops the feed of the wire material 1 to the welding area, the application stop step S3 of controlling the laser oscillator 20 so that the laser oscillator 20 stops the application of the laser to the welding area, after the feed stop step S2, the movement resumption step S5 of controlling the robot 30 so that the welding area and wire material 1 are separated from each other, after the application stop step S3, the termination-mode welding determination step S6 of determining whether the wire material 1 has been welded to the base material 2, on the basis of the feed speed of the wire material 1 detected by the roller encoder 12 in the movement resumption step S5, and the cutting laser application step S8 of, if it is determined in the termination-mode welding determination step S6 that the wire material 1 has been welded, controlling the laser oscillator 20 so that the laser oscillator 20 applies the cutting laser (FIG. 10).

That is, when rotation in a direction indicating the feed (unreeling) of the wire material 1 is detected by the roller encoder 12 after a command to stop the feed of the wire material 1 is issued, it is determined that the wire material 1 has been welded to the termination 1*b* of the welding area and the cutting laser to separate the welded wire material 1 is immediately applied. Thus, the wire material 1 is separated from the weld pool at the termination 1*b* of the welding area using the cutting laser having a lower output than that in normal welding before the weld pool at the termination 1*b* of the welding area is cooled and solidified. This prevents the base material 2 or wire feeder 10 from being pulling and damaged by the wire material 1 that is welded to the termination 1*b* of the welding area and follows the robot 30.

(2) The termination-mode welding determination is made at relatively short intervals (of, for example, about 1 ms). Until the application stop step S3, the controllers 10*a* and 30*a* make the normal-mode welding determination, in which it is determined whether the wire material 1 has been welded to the base material 2, on the basis of the feed speed of the wire material 1 detected by the roller encoder 12 at relatively long intervals (of, for example, about 100 ms). That is, in the termination mode, welding of the wire material 1 is detected in a shorter cycle than that in the normal mode and therefore welding is detected earlier.

(3) The controllers 10*a* and 30*a* include the robot controller 30*a* disposed in the robot 30 and the wire feeder controller 10*a* disposed in the wire feeder 10 (FIG. 3). The robot controller 30*a* performs the feed stop step S2, application stop step S3, and movement resumption step S5 (FIGS. 9B, 10). The wire feeder controller 10*a* performs the termination-mode welding determination step S6 and cutting laser application step S8 (FIGS. 9B, 10). That is, the wire feeder controller 10*a* directly issues the laser oscillator 20 a command to apply the cutting laser not through the robot controller 30*a*. This allows the laser oscillator 20 to apply the cutting laser immediately after welding is detected.

(4) The robot 30 moves the laser oscillator 20 and wire feeder 10 (FIG. 1). The controllers 10*a* and 30*a* perform the movement resumption step S5 by controlling the robot 30 so that the laser oscillator 20 and wire feeder 10 move away from the welding area, as well as perform the cutting laser application step S8 without controlling the robot 30 so that the robot 30 is stopped. Since the movement of the robot 30 is not stopped even when welding is detected, the time required to perform the entire welding cycle is reduced.

(5) When performing the cutting laser application step S8, the controllers 10*a* and 30*a* control the laser oscillator 20 so that the laser oscillator 20 stops the application of the cutting laser to the welding area, on the basis of the feed speed of the wire material 1 detected by the roller encoder 12. This suppresses excessive heating of the welding area and prevents degradation of the quality. Even if welding is erroneously detected, the cutting laser is stopped within a short time.

(6) When performing the cutting laser application step S8, the controllers 10*a* and 30*a* control the laser oscillator 20 so that the laser oscillator 20 applies, to the welding area, a laser having an output corresponding to the feed speed of the wire material 1 detected by the roller encoder 12 in the movement resumption step S5, or a laser pulse having an output equal to or lower than half the output of the laser whose application to the welding area has been stopped in the application stop step S3. By limiting the energy of the laser inputted per unit area of the welding area as described above, the base material 2 at the termination 1*b* of the welding area is prevented from being damaged.

While, in the above embodiment, the example of the specific configuration of the welding apparatus 100 has been described with reference to FIG. 1 and the like, the welding apparatus may have any configuration as long as it welds a base material through a wire material melted by a laser. For example, the welding apparatus may be a 2-beam apparatus that applies a laser to previously heat a base material, or the like. While the example in which the robot 30 moves the wire feeder 10 and laser oscillator 20 has been described, a moving unit that moves the welding area or wire material need not be such a unit. For example, the moving unit may be a unit that moves the base material including the welding area, or may be a unit that moves both the base material and wire material.

While, in the above embodiment, the example in which welding of the wire is detected on the basis of the unreeling speed (the amount of feed per unit time) of the wire material 1 detected by the roller encoder 12 has been described, the detector that is disposed in the feed unit and detects the amount of feed wire material or the reaction force from the wire material need not have such a configuration. For example, by measuring the load on the motor of the feed rollers 11, the detector may detect the reaction force from the wire material 1 that has been pulled and unreeled and thus may detect welding of the wire.

While the present invention has been described as the welding apparatus 100, the present invention may be used as a method for controlling the welding apparatus 100 that welds the base material 2 through the wire material 1 melted by the laser. That is, the method for controlling the welding apparatus includes the feed stop step S2 of controlling the wire feeder 10 so that the wire feeder 10 stops the feed of the wire material 1 to the welding area, the application stop step S3 of controlling the laser oscillator 20 so that the laser oscillator 20 stops the application of the laser to the welding area, after the feed stop step S2, the movement resumption step S5 of controlling the robot 30 so that the welding area and wire material 1 are separated from each other, after the application stop step S3, the termination-mode welding determination step S6 of determining whether the wire material 1 has been welded to the base material 2, on the basis of the feed speed of the wire material 1 detected by the roller encoder 12 in the movement resumption step S5, and the cutting laser application step S8 of, if it is determined in the termination-mode welding determination step S6 that the wire material 1 has been welded, controlling the laser oscillator 20 so that the laser oscillator 20 applies the cutting laser (FIG. 10).

The above embodiment can be combined as desired with one or more of the above modifications. The modifications can also be combined with one another.

According to the present invention, it becomes possible to properly process the termination of the welding area.

Above, while the present invention has been described with reference to the preferred embodiments thereof, it will be understood, by those skilled in the art, that various changes and modifications may be made thereto without departing from the scope of the appended claims.

What is claimed is:

1. A welding apparatus configured to weld a base material through a wire material melted by a welding laser, comprising:
   a laser applicator configured to apply the welding laser to a welding area;
   a wire feeder configured to feed the wire material to the welding area;
   a detector provided on the wire feeder and configured to detect a feed amount of the wire material per unit time;
   a robot configured to move the welding area or the wire material by moving the laser applicator and the wire feeder; and
   a controller configured to respectively control the laser applicator, the wire feeder, and the robot, wherein
   the controller is configured to perform:
      controlling the wire feeder to stop feeding the wire material to the welding area;
      then controlling the laser applicator to stop applying the welding laser to the welding area;
      then controlling the robot so that the laser applicator and the wire feeder are separated from the welding area and the welding area and the wire material are separated from each other;
      determining whether the wire material has been welded to the base material based on the feed amount of the wire material per unit time detected by the detector;
      controlling the laser applicator to apply a cutting laser to separate the wire material welded to the base material without controlling the robot to stop when it is determined that the wire material has been welded to the base material; and
      controlling the laser applicator to stop applying the cutting laser to the welding area based on the feed amount of the wire material per unit time detected by the detector.

2. The welding apparatus according to claim 1, wherein the determining is a first determining performed at a first interval, wherein the controller is further configured to perform:
  a second determining whether the wire material has been welded to the base material based on the feed amount of the wire material per unit time detected by the detector at a second interval longer than the first interval, before controlling the laser applicator to stop applying the welding laser to the welding area.

3. The welding apparatus according to claim 1, wherein the controller includes:
  a first controller provided on the robot; and
  a second controller provided on the wire feeder, wherein
the first controller is configured to perform:
  the controlling the wire feeder to stop feeding the wire material to the welding area;
  the controlling the laser applicator to stop applying the welding laser to the welding area; and
  the controlling the robot so that the laser applicator and the wire feeder are separated from the welding area and the welding area and the wire material are separated from each other, wherein
the second controller is configured to perform:
  the determining whether the wire material has been welded to the base material based on the feed amount of the wire material per unit time detected by the detector; and
  the controlling the laser applicator to apply the cutting laser to separate the wire material welded to the base material without controlling the robot to stop when it is determined that the wire material has been welded to the base material.

4. The welding apparatus according to claim 3, wherein the second controller includes a dedicated arithmetic processing circuit including:
  an encoder counter configured to process signals from the detector;
  a CPU configured to perform the determining whether the wire material has been welded to the base material based on the feed amount of the wire material per unit time detected by the detector, the feed amount of the wire material per unit time detected by the detector being processing results by the encoder counter; and
  a D/A converter or a digital I/O configured to perform the controlling the laser applicator to apply the cutting laser to separate the wire material welded to the base material without controlling the robot to stop when it is determined that the wire material has been welded to the base material.

5. The welding apparatus according to claim 1, wherein the controller is configured to perform:
  the controlling the laser applicator to apply the cutting laser to separate the wire material welded to the base material without controlling the robot to stop when it is determined that the wire material has been welded to the base material including controlling the laser applicator to apply the cutting laser having an output corresponding to the feed amount of the wire material per unit time detected by the detector or to apply the cutting laser in a pulse having an output equal to or lower than a half of an output of the welding laser, to the welding area.

* * * * *